US005243121A

United States Patent [19]

Madon et al.

[11] Patent Number: 5,243,121

[45] Date of Patent: Sep. 7, 1993

[54] FLUID CATALYTIC CRACKING PROCESS FOR INCREASED FORMATION OF ISOBUTYLENE AND ISOAMYLENES

[75] Inventors: Rostam J. Madon, Flemington; Gerald S. Koermer, Roseland; Michel Deeba, North Brunswick, all of N.J.; Kathleen Y. Yau, Holland, Pa.

[73] Assignee: Engelhard Corporation, Iselin, N.J.

[21] Appl. No.: 854,125

[22] Filed: Mar. 19, 1992

[51] Int. Cl.[5] ........................ C07C 4/02; C10G 11/02

[52] U.S. Cl. .................................. 585/649; 585/653; 208/120; 208/122

[58] Field of Search ................ 585/649, 653; 208/120, 208/122

[56] References Cited

U.S. PATENT DOCUMENTS

| | | | |
|---|---|---|---|
| 4,493,902 | 1/1985 | Brown et al. | 502/65 |
| 5,055,437 | 10/1991 | Herbst et al. | 502/67 |
| 5,069,890 | 12/1991 | Pei-Shing et al. | 423/328 |

OTHER PUBLICATIONS

"U.S. Refiners Scramble to Meet Reformulated Gasoline Mandate", Oil & Gas Journal, Jan. 27, 1992 (pages unavailable).

"Refiners Have Options to Deal with Reformulated Gasoline" G. L. Yepsen and A. Witoshkin, Oil & Gas Journal, Apr. 8, 1991 (pages unavailable).

L. Pine, P. Maher and A. Wachter, J. Catal., 85, 466 (1984).

J. Biswas and I. Maxwell, Applied Catal., 63, 197 (1990).

"The Impact of Microactivity Test Conditions on Product Yields and Properties", M. J. Margolis and J. B. McLean, AIChE National Meeting, Nov., 1991 (pages unavailable).

G. Olah, G. Prakash, R. Williams, L. Field and K. Wade, Hypercarbon Chemistry, J. Wiley and Sons, New York, 1987 (pages unavailable).

D. H. Pappal and P. H. Schipper, Fluid Catalytic Cracking II: Concepts in Catalyst Design, 45 (1991).

S. J. Miller and C. R. Hsieh, Fluid Catalytic Cracking II: Concepts in Catalyst Design, 96 (1991).

Catalysis Reviews—Science and Engineering, vol. 18, No. 1, 1978, (page unavailable).

Engelhard Technical Brochure #EC5847P, "Precision and Octidyne Extra" 1989 (page unavailable).

Engelhard Technical Brochure TI-817 "Monadyne Series" 1989 (page unavailable).

Engelhard Technical Brochure TI-751 "Octidyne Series" 1989 (page unavailable).

Madon, R. J., "Role of ZSM-5 and Ultrastable Y Zeolites for Increasing Gasoline Octane Number", J. of Catalysis 129, 275-287 (1991).

"Methylcyclohexane and methycyclohexene cracking over zeolite Y Catlaysis", Corma, A., Mocholi, F., Orchilles, V., Koermer, G., Madon, R., Applied Catalysis, 67 (1991) 307-324.

"Cracking of Long-Chain Alkyl Aromatics on USY Zeolite Catalysts", Corma, A., Miguel, P., Orchilles, A., Koermer, G., J. of Catalysis 135, 45-59 (1992).

"Means of Increasing Motor Octanes in the FCC Unit", Witoshin, A., Koermer, G., Madon, R., 1988 NPRA Annual Meeting (page unavailable).

"New Approach for the Laboratory Evaluation of FCC Catalysts" Moorehead, E., McLean, J. and Witoshin, A., 1990 NPRA Annual Meeting (page unavailable).

*Primary Examiner*—Anthony McFarlane
*Assistant Examiner*—Nhat D. Phan
*Attorney, Agent, or Firm*—Inez L. Moselle

[57] ABSTRACT

A composite fluid catalytic cracking catalyst comprising a non-zeolitic component of at least 45% $Al_2O_3$ and containing $\leqq 30\%$ Y zeolite with unit cell size $\leqq 24.29$ Å, the matrix (non-zeolitic component) of said catalyst having a B.E.T. surface area $\geqq 50$ $m^2/g$ and a catalyst Lewis/Bronsted acid site ratio of $\geqq 1.5$ wherein the total number of Bronsted acid sites is $\leqq 30$ micromoles/g of catalyst. The catalyst is used to increase the isobutylene and isoamylenes content of cracked products obtained in a fluid catalytic cracking unit.

9 Claims, 2 Drawing Sheets

FLUID CATALYTIC CRACKING PROCESS FOR INCREASED FORMATION OF ISOBUTYLENE AND ISOAMYLENES

BACKGROUND OF THE INVENTION

This invention relates to the fluid catalytic cracking (FCC) of petroleum feedstocks to produce transportation fuels and is especially directed to improvements in FCC to increase the isobutylene and isoamylenes contents of the cracked product.

Increased addition of oxygenated materials to gasoline has been mandated by the US Government. The current industry additives of choice are methyl tertiary butyl ether (MTBE) and tertiary amyl methyl ether (TAME). The technology to make MTBE is well known and commercially viable. Briefly, the ether is manufactured by reacting isobutylene and methanol over a resin catalyst. Obtaining sufficient amounts of isobutylene and isoamylenes at reasonable cost is crucial. In most modern refineries, a dehydroisomerization process can be operated to convert butanes to isobutylene. However, a fluid catalytic cracker is the best if not the only source of making isobutylene and isoamylenes while processing heavy hydrocarbon streams such as gas oil and resid. An FCC catalyst that enhances these olefin yields is essential for viable production of MTBE and TAME in refineries.

It is well known in the literature that lowering the unit cell size (UCS) of a Y zeolite via steaming gives a catalyst which enhances olefin selectivity during the catalytic cracking of hydrocarbons. We have discovered, however, that we can make further improvements in isobutylene and isoamylene yields than by just lowering unit cell size of Y.

SUMMARY OF THE INVENTION

The present invention comprises an FCC operation wherein the catalyst is a composite comprising a non-zeolitic alumino-silicate (or mixtures of $Al_2O_3$, $SiO_2$, and $SiO_2$—$Al_2O_3$ component) of at least 45% $Al_2O_3$ and containing ≦30% Y zeolite with a unit cell size ≦24.29 Å, the matrix of said catalyst having a BET surface area >50 g, said composite catalyst having a Lewis/Bronsted acid site ratio of >1.5, and preferably greater than 2.5, wherein the total number of Bronsted acid sites is <30 micromoles/g of catalyst, preferably less than 20 micromoles/g of catalyst, but greater than 0 micromoles/g of catalyst.

Such composite catalysts give significantly enhanced amounts of isobutylene and isoamylenes during catalytic cracking of gas oil. The % Y zeolite is determined by x-ray diffraction (ASTM D3906-85a). Unit cell size is determined by x-ray diffraction using ASTM D3942-85.

THE DRAWINGS

DESCRIPTION OF PREFERRED EMBODIMENTS

Figure 1:
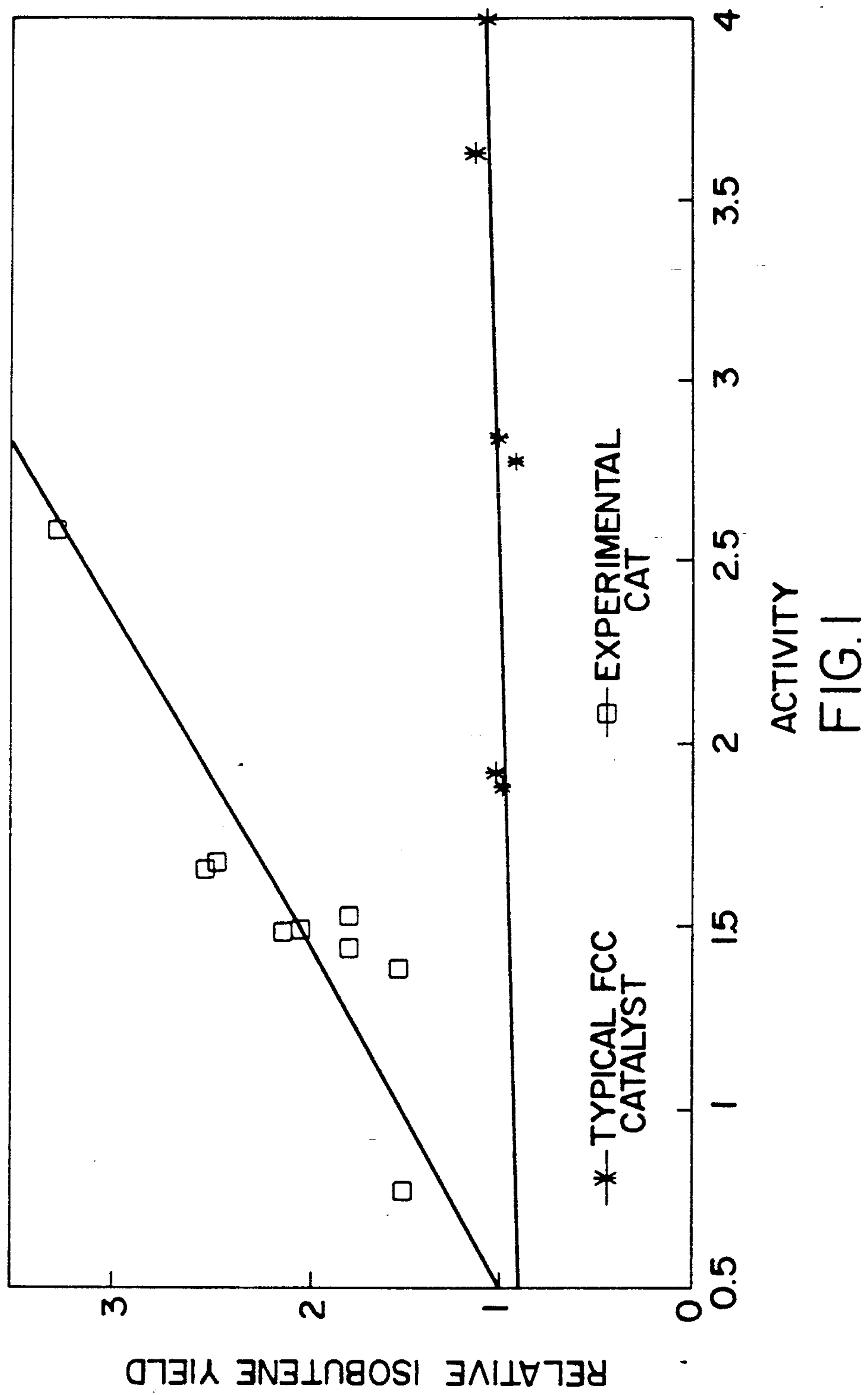
FIG. 1 is a plot of relative isobutylene yield vs. activity [conversion/(100-conversion] for a standard commercial FCC catalyst and a catalyst used in practice of the invention.

The starting material used to prepare catalysts employed in practice of this invention may be an in situ type FCC catalyst supplied by Engelhard Corporation such as MONADYNE TM, PRECISION TM or OCTIDYNE TM catalysts. The starting material may also be a Y zeolite which has been intimately bound with an amorphous part of the composition matrix. It is important that the amorphous part of the composition is high in aluminum content which should be greater than 45 wt %. The $Al_2O_3$ may be part of an alumino-silicate material or mixed with silica, or mixed with silica-alumina. The $Al_2O_3$ mixed with the above amorphous components may be any phase of $Al_2O_3$. It is preferable to have minimal (e.g., less than 1.0% ReO by weight) and preferably no rare earth cations and to have sodium levels below 0.3 wt % $Na_2O$, preferably 0.1% or below, based on the dry weight of catalyst.

Catalysts of the invention may be made by severe hydrothermal treatment of the types of starting materials stated above. Hydrothermal treatment conditions will depend on the amount of Y zeolite in the starting material. In general, the conditions include (i) temperatures of 1450° F. to 1800° F. (ii) times of 1 to 25 h, and (iii) 25 to 100% steam. Higher temperatures may require shorter times and lower steam partial pressure. For example, at 1450° F., Material A (described below) requires 15 to 24 h of hydrothermal treatment in 100% steam; whereas at 1550° F. only approximately 5 hours are sufficient to get similar results. Hydrothermal treatment does not affect the amount of rare earth or sodium cations which are low as stated above for the starting materials.

Additive materials compatable with FCC processing such as octane boosters (ZSM-5) and Beta, CO combustion promoters, SOx capture additives, etc., may be added to such catalysts.

The FCC process of the invention may be carried out in conventional heat balanced FCC units in the absence of added hydrogen under conditions which will vary depending upon the refinery. Operating variables for the riser and regenerator are well known in the art and are described extensively in the literature. See, for example, CATALYSIS REVIEWS—SCIENCE AND ENGINEERING, VOL. 18, NUMBER 1, 1978. While conventional FCC cracking and regeneration conditions may be used with conventional FCC feedstock such as gas oils and resids, catalysts of the invention produce a product slate that is different from those achieved with conventional FCC catalysts. Most significant are the appreciable increases in isobutylene and isoamylene yields. Gasoline yields decrease whereas octane number increases. Isobutylene and isoamylenes are recovered from cracked products using conventional FCC separation technology.

We have also found that addition of relatively large amounts (e.g., 10–20% by weight of kaolin bound microspheres containing about 15% ZSM-5) to our isobutylene catalysts results in an unexpected significant decrease in coke yield and an increase in activity.

The performance properties of modified catalysts of the invention are such that some changes in FCCU operation may be required in order to take full advantage of the potential yield benefits of the catalysts. In particular, the total wet gas ($C_3$ and $C_4$ hydrocarbons) handling capacity of the unit may need to be increased.

This can be accomplished by means well known to those skilled in the art.

Commercial yield projections for various operating scenarios for maximizing light olefin yields were carried out by computer simulation. These projections indicated that isobutylene yield increases of 50–200% can be achieved compared with a typical current operation. The results show that catalysts of the invention are more selective for increasing isobutylene yield than other options such as high riser temperatures or ZSM-5 additives wit conventional FCC catalysts.

While it is expected that some investment in the gas plant of an FCCU will be required, this may turn out to be an economically preferred route compared with alternative supplies of isobutylene produced by isomerization and dehydrogenation of butanes.

In the following illustrative examples, the starting cracking catalysts material described as Material A contained approximately 20 wt % Y, 0% rare earth, and <0.1% $Na_2O$; material B contained approximately 40 wt % Y, 0.1% rare earth, and 0.1% $Na_2O$; and material C contained approximately 12 wt % Y, 0% rare earth, and 0.3% $Na_2O$. In all these materials, the rest of the composition, and thus the predominant part of the starting material is amorphous alumino-silicate, in which the total $Al_2O_3$ content was greater than 50%.

Above materials when hydrothermally treated are designated AH, BH, and CH, respectively. Hydrothermal treatments of materials in the examples were performed with 100% steam at ambient pressure.

Catalyst testing and hydrothermal treatments were carried out using procedures referred to in U.S. Pat. No. 4,493,902, Brown et al unless otherwise indicated. All yields given in the examples are on a weight-on-feed-basis.

Lewis and Bronsted acidity values were measured as follows. Infrared spectra were collected at 40° C. in the diffuse reflectance mode using a Spectra Tech controlled-environment chamber in a Perkin Elmer 1750 spectrometer. The samples were dried for 1 h at 723K under flowing $N_2$, and the dehydration process was monitored by observing the disappearance of the water band at 1645 $cm^1$. Pyridine vapor was then introduced to the sample in flowing $N_2$ at room temperature; after 1 min the flow was shut off and the sample allowed to equilibrate with the pyridine for 1 h. Spectra collected after each of two successive 1 h purges in $N_2$ at 40 and 200° C. indicated two distinct desorption stages. The lowest temperature purge removed predominantly physisorbed pyridine (1583 $cm^{-1}$) while the second eliminated hydrogen-bonded pyridine (1600 $cm^{-1}$). Pyridine was not decomposed at the highest desorption temperature. Infrared band areas (Kubelka-Munk units) at 1450 and 1550 $cm^{-1}$ were used to estimate the amounts of pyridine adsorbed on Lewis and Bronsted acid sites, respectively. These areas were reproducible to within about 10% due to variations in sample grinding and packing in the reflectance chamber sample cup.

Unlike conventional quantitative transmission infrared spectroscopy, where extinction coefficients are obtained from a linear plot of band intensity versus sample concentration, there is no clearly defined equivalent "beam scatter" parameter for the diffuse reflectance technique. This makes defining an extinction coefficient in diffuse reflectance subjective; it includes contributions from the experimental setup and the sample density which are difficult to quantify. In this study, extinction coefficients have been estimated by correcting errors due to sample density differences by using both ammonia desorption and thermogravimetric pyridine adsorption techniques to obtain total acidity estimates for our samples. Therefore the extinction coefficients used to quantify our data were effective extinction coefficients, and these values may not be directly transferable to a different experimental setup. Their relative values, however, will be constant, allowing quantitative comparison between the various samples of this study.

Acidity, in equivalent mmol/g, was calibrated using ammonia capacity at 200° C. to determine total acidity for Lewis only (alumina) and Bronsted-only (pure H-zeolites) samples. This calibration converts 200° C. infrared pyridine peak areas in units of Kubelka Munk reflectance to equivalent ammonia acidity. The Pyridine peak for Bronsted acid sites at 1550 $cm^{-1}$ divided by 4.7 gives equivalent Bronsted acidity. The pyridine peak for Lewis acid sites at 1450 cm divided by 6.9 gives equivalent Lewis acidity.

EXAMPLE 1

The following table gives results of microactivity tests (MAT) at 910° F. and 48s gas oil delivery time. Catalyst/oil ratios were adjusted to obtain 70% conversion.

TABLE 1

| | MATERIAL AH | MATERIAL BH | MATERIAL B |
|---|---|---|---|
| HYDROTHERMAL TREATMENT CONDITIONS | 1550° F./5h | 1550° F./5h | 1450° F./4h |
| UCS, A | 24.26 | 24.27 | 24.29 |
| CATALYST/OIL | 8.1 | 6.3 | 5 |
| CONVERSION, % | 71 | 70 | 71 |
| $C_4$ YIELDS, % | | | |
| Isobutylene | 1.8 | 1.6 | 1.0 |
| Straight butenes | 3.8 | 3.7 | 2.9 |
| Isobutane | 4.5 | 4.5 | 5.5 |
| N-butane | 0.7 | 0.8 | 0.9 |
| Isobutylene / Total $C_4$ olefins | 0.32 | 0.30 | 0.26 |
| $C_4$ Olefins / $C_4$ paraffins | 1.1 | 1.0 | 0.6 |

Data in Table 1 show that Materials AH and BH, hydrothermally treated at the more extreme conditions, gave higher yields of isobutylene and olefins than Material B steamed at conventional conditions (1450° F., 4 h).

Table 2 compares Material AH with a commercial HY zeolite, both hydrothermally treated to the same extent. The data show that even though Material AH has a higher unit cell size than steamed commercial Y, it made significantly more isobutylene than the commercial Y. Also, for Material AH isobutylene was closer to the thermodynamic equilibrium ratio of 0.45.

TABLE 2

| | MATERIAL AH | COMMERCIAL Y ZEOLITE |
|---|---|---|
| HYDROTHERMAL CONDITIONS | 1500° F./24h | 1500° F./25h |
| UCS, A | 24.27 | 24.23 |
| CATALYST/OIL RATIO | 9.9 | 5 |
| CONVERSION, % | 66 | 66 |
| $C_4$ YIELDS, % | | |
| Isobutylene | 1.9 | 0.6 |
| Straight butenes | 3.7 | 1.6 |
| Isobutane | 4.1 | 4.2 |

TABLE 2-continued

| | MATERIAL AH | COMMERCIAL Y ZEOLITE |
|---|---|---|
| N-butane | 0.6 | 0.7 |
| Isobutylene / Total $C_4$ olefins | 0.34 | 0.27 |
| $C_4$ Olefins / $C_4$ paraffins | 1.2 | 0.45 |

EXAMPLE 2

Figure 2:
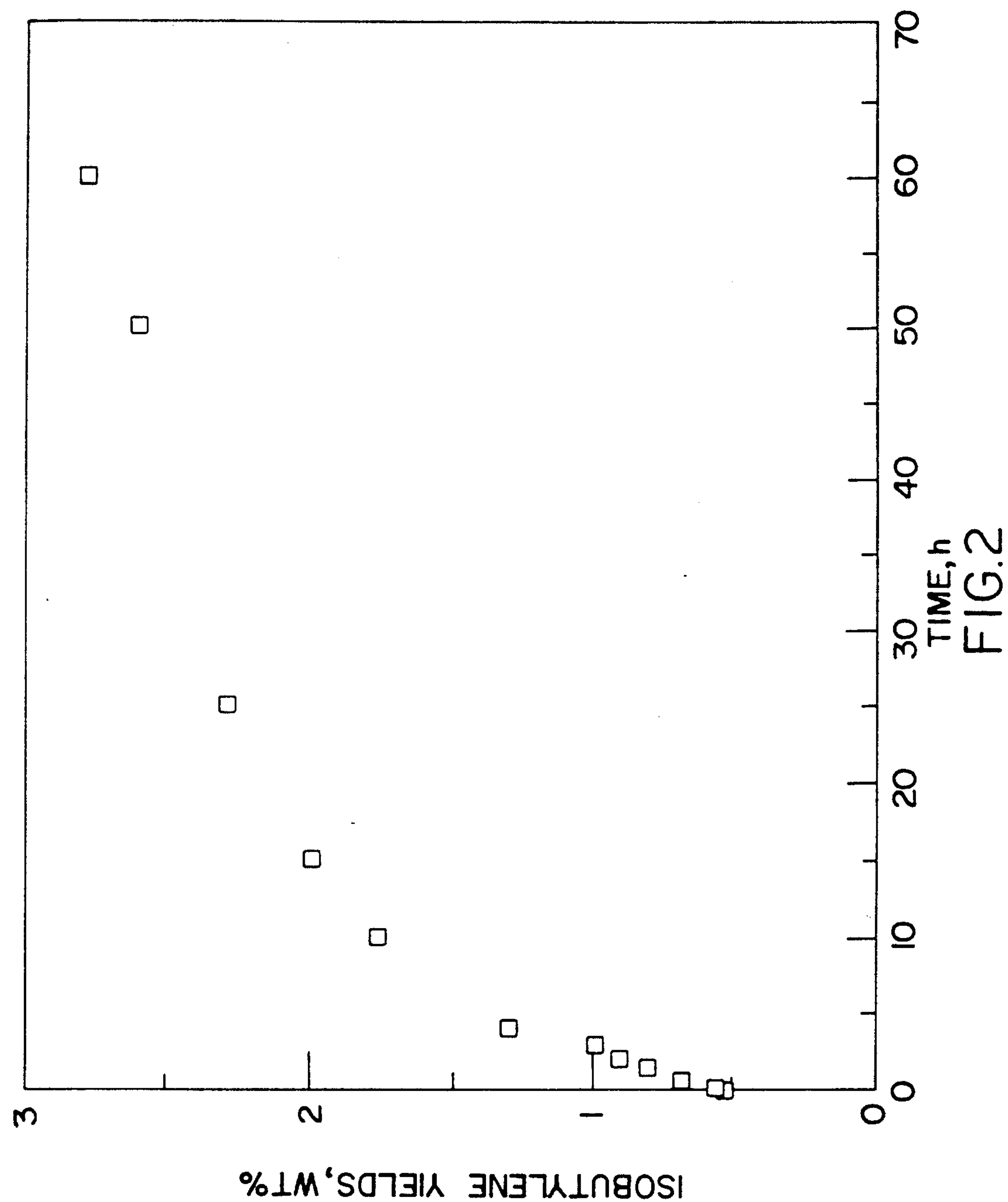
FIG. 2 is a plot of effect of time of hydrothermal treatment in a preparation of a catalyst used in the invention.

FIG. 2 shows the effect of time of hydrothermal treatment on Material C. Catalyst/oil ratios were varied to give 72% MAT conversions for all hydrothermally treated catalysts. Note that after 4 h steaming at 1450° F., the UCS was already 24.27 A, with an isobutylene yield of 1.3%; further steaming up to 60 h increased the isobutylene yield significantly to 2.8 % even though the UCS only changed to 24.26 A.

EXAMPLE 3

FIG. 1 is a plot of relative isobutylene yield vs. activity [conversion/(100-conversion)] for two FCC catalysts. One was a standard commercial FCC catalyst. The other was a typical catalyst of this invention. The data was generated from the standard microactivity test where activity was varied by changing the catalyst to oil ratio and the wt% isobutylene yield on feed was divided by a constant. The standard commercial catalyst gave a very small increase in isobutene as activity increased. In contrast, the isobutene yield of the catalyst of the present invention increased dramatically as activity increased.

EXAMPLE 4

Material A was hydrothermally treated for 7 h at 1550° F. using 100% steam at 1 bar to give AH. This material was divided into two portions. One portion was run in the microactivity test. The second portion was blended with ZSM-5 in a kaolin matrix so that the % ZSM-5 in the composite was about 15% and the ZSM-5 in the total catalyst was about 3%. This blend was also tested by the standard microactivity test.

The results are in Table 3. Data in this table show that the coke yield from the catalyst containing ZSM-5 was lower than that of the catalyst without ZSM-5. In addition the activity of the catalyst with ZSM-5 was higher than the catalysts without ZSM-5 at the same catalyst to oil ratio. With ordinary cracking catalyst the typical behavior with regard to activity is that activity decreases by approximately the blend ratio of the additive; i.e., a catalyst containing 20% of the ZSM-5 blend would have almost a 20% decrease in activity. This normally occurs because ZSM-5 has a very low primary cracking activity.

EXAMPLE 5

Material A was hydrothermally treated at 1500° F. for 10 h with 100% steam at 1 bar to obtain AH. This catalyst was tested by running a standard MAT. In addition, the hydrothermally treated catalyst was blended with enough ZSM-5 blend to give a blend containing 80% AH. This catalyst blend was also tested by a standard MAT. The catalyst without ZSM-5 had higher coke yields and lower activity. See Table 4.

EXAMPLE 6

In the following example, pilot unit studies were carried out with the same gas oil feed as used in the MAT on a modified recirculating ARCO LAB - FCC pilot unit (W.H. Humes, Chemical Eng. Progress, page 51, Feb., 1983) which has a 17 foot lean phase plug flow cracking riser. The unit was operated under computer control at atmospheric pressure and nitrogen was used for dispersion. The catalyst charge to the unit was around 2600 g with an oil feed rate between 9 and 12 g/min. The riser was operated under adiabatic conditions with the riser temperature at the top being 960° F. Catalyst regeneration was carried out in the regenerator at 1200° F. with air at 9 liters/min. Conversion was adjusted by varying catalyst circulation rate and/or oil feed rate. Liquid products and unreacted gas oil were separated from product gases with the help of a $C_4$–$C_5$ fractionation column. The product gases and flue gases were analyzed by standard gas chromatography. The liquid was analyzed by simulated distillation chromatography (ASTM D2887). A more detailed breakdown of the gasoline fraction was obtained using a PIONA analyzer from Analytical Controls. This latter analysis allowed us to obtain the concentration of isoamylenes in the gasoline.

A catalyst composite was made as follows. Material A was hydrothermally treated at 1500° F. for 10 h. Material B was hydrothermally treated at 1450° F. for 23 h. The hydrothermally treated materials were blended as follows: 87.5 wt % AH and 12.5 wt % BH. This resulting catalyst was run in the recirculating FCC pilot unit. At 68% conversion, the gasoline fraction contained 6.89 wt % isoamylenes.

TABLE 3

Effects of ZSM-5 on High Isobutylene Catalysts

| Catalyst AH | | | | | | |
|---|---|---|---|---|---|---|
| C/O | 5.03 | 4.96 | 7.10 | 7.07 | | |
| Activity | 1.22 | 1.42 | 1.56 | 1.59 | | |
| Coke Yield | 4.65 | 4.59 | 5.18 | 5.13 | | |
| Coke/Act | 3.81 | 3.23 | 3.32 | 3.23 | | |
| Catalyst AH + 16% ZSM-5 Blend | | | | | | |
| C/O | 5.06 | 5.00 | 6.99 | 7.08 | 7.04 | 7.07 |
| Activity | 1.53 | 1.54 | 1.74 | 1.76 | 1.74 | 1.82 |
| Coke Yield | 4.04 | 4.04 | 4.76 | 4.77 | 4.76 | 4.91 |
| Coke/Act | 2.64 | 2.62 | 2.74 | 2.71 | 2.74 | 2.70 |

TABLE 4

Effects of ZSM-5 on Coke Yield

| Catalyst | AH | | | AH + 20% ZSM-5 Blend | | |
|---|---|---|---|---|---|---|
| C/O | 4.99 | 5.04 | 5.01 | 5.08 | 7.13 | 7.04 |
| Activity | 1.23 | 1.66 | 1.41 | 1.59 | 1.95 | 2.06 |
| Coke | 4.00 | 5.17 | 3.89 | 3.94 | 4.96 | 4.86 |
| Coke/Activity | 3.25 | 3.11 | 2.76 | 2.48 | 2.54 | 2.36 |

We claim:

1. A process for the catalytic cracking of a hydrocarbon charge to produce isobutylene and isoamylenes which comprises contacting said hydrocarbon charge at cracking temperature in the absence of added hydrogen with a composite fluid catalytic cracking catalyst comprising a non-zeolitic matrix component containing at least 45% by weight $Al_2O_3$ and $\leqq 30\%$ Y zeolite having a unit cell size $\leqq 24.29$ Å, the concentration of said Y zeolite being determined by x-ray diffraction, using the ASTM D3906 85a procedure, the matrix of said composite catalyst having a BET surface area $\geqq 50\ m^2/g$, said catalyst having a Lewis/Bronsted acid site ratio of $\geqq 1.5$ wherein the total number of Bronsted sites is $\leqq 30$ micromoles/g of catalyst, and recovering from the resulting products of conversion a concentrate of isobutylene and isoamylenes.

2. The process of claim 1 wherein the total number of Bronsted sites is less than 20 micromoles/g of catalyst.

3. The process of claim 1 wherein said catalyst contains less than 0.3% $Na_2O$ by weight on a dry weight basis.

4. The process of claim 1 wherein said catalyst contains less than 0.1% $Na_2O$ by weight on a dry weight basis.

5. The process of claim 1 wherein said catalyst contains less than 1% REO by weight on a dry weight basis.

6. The process of claim 1 wherein said catalyst is essentially free from rare earth.

7. The process of claim 1 wherein the $Al_2O_3$ matrix of said non-zeolitic component contains silica and alumina.

8. The process of claim 1 wherein ZSM-5 is present with said cracking catalyst.

9. The process of claim 1 wherein the unit cell size of said Y zeolite catalyst is less than 24.26 Angstroms.

* * * * *